US011180688B2

(12) United States Patent
Konishi et al.

(10) Patent No.: US 11,180,688 B2
(45) Date of Patent: Nov. 23, 2021

(54) SPHERICAL MAGNESIUM OXIDE AND PRODUCTION METHOD THEREFOR

(71) Applicant: TATEHO CHEMICAL INDUSTRIES CO., LTD., Ako (JP)

(72) Inventors: Takeshi Konishi, Ako (JP); Mareshi Takegaki, Ako (JP); Yoshihisa Osaki, Ako (JP); Tomoaki Chikazawa, Ako (JP); Akinori Saito, Ako (JP); Yuki Morita, Ako (JP)

(73) Assignee: TATEHO CHEMICAL INDUSTRIES CO., LTD., Ako (JP)

(*) Notice: Subject to any disclaimer, the term of this patent is extended or adjusted under 35 U.S.C. 154(b) by 74 days.

(21) Appl. No.: 16/481,445

(22) PCT Filed: Jan. 24, 2018

(86) PCT No.: PCT/JP2018/002125
§ 371 (c)(1),
(2) Date: Jul. 26, 2019

(87) PCT Pub. No.: WO2018/150826
PCT Pub. Date: Aug. 23, 2018

(65) Prior Publication Data
US 2019/0359873 A1 Nov. 28, 2019

(30) Foreign Application Priority Data
Feb. 17, 2017 (JP) .............................. JP2017-027919

(51) Int. Cl.
*C09K 5/14* (2006.01)
*C01F 5/08* (2006.01)
(Continued)

(52) U.S. Cl.
CPC .................. *C09K 5/14* (2013.01); *C01F 5/08* (2013.01); *C08K 3/22* (2013.01); *C08K 7/18* (2013.01);
(Continued)

(58) Field of Classification Search
CPC ... C09K 5/08; C09K 5/14; C08K 3/22; C08K 2003/222; C08K 7/18; C08K 2201/001;
(Continued)

(56) References Cited

U.S. PATENT DOCUMENTS 8,518,536 B2* 8/2013 Ishibashi .................. C01F 5/08
428/402
10,501,635 B2* 12/2019 Nishida ..................... C01F 5/24
(Continued)

FOREIGN PATENT DOCUMENTS

CN       1839182 A      9/2006
EP       2 455 339 A1   5/2012
(Continued)

OTHER PUBLICATIONS

English machine translation of Kuroda (JP 2012-201511 A). (Year: 2012).*
(Continued)

*Primary Examiner* — Matthew R Diaz
(74) *Attorney, Agent, or Firm* — Lewis Roca Rothgerber Christie LLP

(57) ABSTRACT

Provided are: a spherical magnesium oxide having not only high sphericity but also smooth surface and having excellent moisture resistance and excellent filling properties, and a method producing the same. In the present invention, by controlling the boron and iron contents of the calcined magnesium oxide to be in the respective predetermined ranges, there is provided a spherical magnesium oxide having a volume-based cumulative 50% particle diameter
(Continued)

(D50), as measured by a laser diffraction/scattering particle size distribution measurement, in the range of from 3 to 200 μm, which is the range for a relatively large particle diameter, and a high sphericity of 1.00 to 1.20, as measured from viewing a SEM photomicrograph, as well as smooth surface, and having excellent moisture resistance and excellent filling properties. A predetermined spherical magnesium oxide is provided by virtue of the synergies obtained from the boron content of 300 to 2,000 ppm and the iron content of 100 to 1,500 ppm.

20 Claims, 1 Drawing Sheet

(51) Int. Cl.
  *C08K 3/22* (2006.01)
  *C08K 7/18* (2006.01)
(52) U.S. Cl.
  CPC ...... *C01P 2004/03* (2013.01); *C01P 2004/32* (2013.01); *C01P 2004/34* (2013.01); *C01P 2004/61* (2013.01); *C01P 2006/12* (2013.01); *C01P 2006/32* (2013.01); *C01P 2006/80* (2013.01); *C08K 2003/222* (2013.01); *C08K 2201/001* (2013.01); *C08K 2201/005* (2013.01); *C08K 2201/006* (2013.01)
(58) Field of Classification Search
  CPC ... C08K 2201/005; C04B 2/00; C04B 14/304; C01P 2004/03; C01P 2004/32; C01P 2004/34; C01P 2004/60; C01P 2004/61; C01P 2006/12; C01P 2006/32; C01P 2006/80; C01F 5/02; C01F 5/04; C01F 5/06; C01F 5/10; C01F 5/12; C01F 5/22; C01F 5/08
  See application file for complete search history.

(56) References Cited

U.S. PATENT DOCUMENTS

| | | | |
|---|---|---|---|
| 2006/0286295 A1 | 12/2006 | Kiyokawa et al. | |
| 2018/0215627 A1* | 8/2018 | Kinoshita | ............ C01G 49/009 |

FOREIGN PATENT DOCUMENTS

| | | | | |
|---|---|---|---|---|
| JP | 2011-20870 A | | 2/2011 | |
| JP | 2012-201511 A | | 10/2012 | |
| JP | 2012201511 A | * | 10/2012 | ............... C01F 5/16 |
| JP | 2014-136654 A | | 7/2014 | |
| JP | 2014136654 A | * | 7/2014 | ............... C01F 5/08 |
| JP | 2014-214222 A | | 11/2014 | |
| JP | 2016-88838 A | | 5/2016 | |
| JP | 2016088838 A | * | 5/2016 | |
| WO | WO-2005118504 A1 | * | 12/2005 | ............ C04B 35/04 |
| WO | WO-2016147862 A1 | * | 9/2016 | ............... C01F 5/02 |
| WO | WO-2017195686 A1 | * | 11/2017 | ............ C21D 8/1277 |

OTHER PUBLICATIONS

English machine translation of Kuroda (JP 2014-136654 A) (Year: 2014).*

English machine translation of Sueda (JP 2016-08838 A) (Year: 2016).*

English machine translation of Yamamto et al. (WO 2005-118504 A1) (Year: 2005).*

CN Office action dated Apr. 27, 2021 for corresponding Chinese patent application No. 201880006231.X and machine translation thereof, 17 pages.

\* cited by examiner

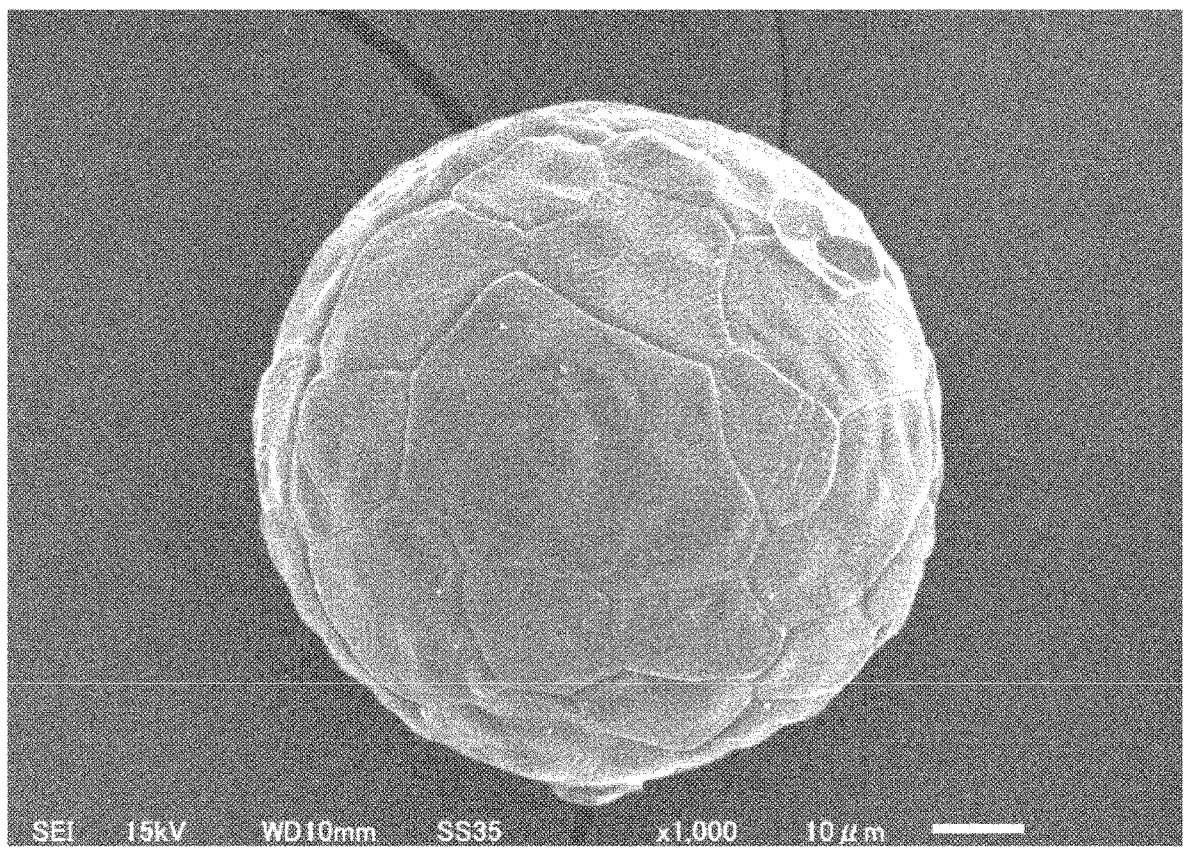

SPHERICAL MAGNESIUM OXIDE AND PRODUCTION METHOD THEREFOR

CROSS-REFERENCE TO RELATED APPLICATION(S)

This application is a National Phase Patent Application and claims priority to and the benefit of International Application Number PCT/JP2018/002125, filed on Jan. 24, 2018, which claims priority to Japanese Patent Application Number 2017-027919, filed on Feb. 17, 2017, the entire contents of all of which are incorporated herein by reference.

TECHNICAL FIELD

The present invention relates to a spherical magnesium oxide having not only high sphericity but also smooth surface and having excellent moisture resistance and excellent filling properties and a method for producing the same.

BACKGROUND ART

As thermally conductive fillers, conventionally, silica and alumina and the like have been used, but silica has such a low thermal conductivity that heat dissipation is unsatisfactory for dealing with an increase of heating value due to the recent increase of the integration degree, power, and speed of semiconductors, and has a problem in the stable operation of semiconductors and the like. On the other hand, alumina having a higher thermal conductivity than that of silica can improve heat dissipation properties, as compared to silica, but alumina has a high hardness and hence poses a problem in that it causes a kneader, a molding machine and a mold to markedly wear. Therefore, studies are being made on the use of magnesium oxide as a thermally conductive filler, wherein the magnesium oxide has a thermal conductivity which is higher than that of silica by one digit and is around twice as high as that of alumina, has a low hardness as compared to alumina, and can suppress wearing of the production equipment. Magnesium oxide is, however, likely to react with water in air to be changed to magnesium hydroxide. Therefore, the development of magnesium oxide having excellent moisture resistance such that it is not changed to magnesium hydroxide even when used for a long term is desired.

When magnesium oxide is used as a thermally conductive filler, high filling properties are needed for obtaining high heat dissipation properties, and there has been proposed magnesium oxide containing a boron compound and the like and having the controlled aggregation state or controlled particle size distribution (Patent Literature 1). However, the magnesium oxide in the above patent document has a low sphericity, and has problems about the filling properties, smoothness of the particle surface, and moisture resistance. For solving the problems, a spherical magnesium oxide has been proposed in which, instead of the boron compound, a lithium compound is added so that the Li content becomes 15 to 500 ppm in an attempt to improve the sphericity (Patent Literature 2).

CITATION LIST

Patent Literature

Patent Literature 1: Japanese Unexamined Patent Publication No. 2011-20870 (Sakai Chemical Industry Co., Ltd.; boron contained)

Patent Literature 2: Japanese Unexamined Patent Publication No. 2016-88838 (Sakai Chemical Industry Co., Ltd.; no boron contained, but lithium contained, spherical)

SUMMARY OF INVENTION

Technical Problem

However, the spherical magnesium oxide obtained by adding a Li compound has unsatisfactory smoothness of the particle surface, and further has a problem about the moisture resistance. Accordingly, a problem to be solved by the present invention is to provide a spherical magnesium oxide which contains no Li compound, has not only high sphericity but also smooth surface, and has excellent moisture resistance and excellent filling properties, and a method for producing the same.

Solution to Problem

The present inventor has conducted extensive and intensive studies in order to solve the above-mentioned problems. As a result, it has been found that, by controlling the boron and iron contents to be in the respective predetermined ranges, a spherical magnesium oxide having not only high sphericity but also smooth surface and having excellent moisture resistance and excellent filling properties can be obtained. Accordingly, the present invention is directed to a spherical magnesium oxide containing boron in an amount of 300 to 2,000 ppm and iron in an amount of 100 to 1,500 ppm, having a volume-based cumulative 50% particle diameter (D50) in the range of from 3 to 200 μm, as measured by a laser diffraction/scattering particle size distribution measurement, and having a sphericity of 1.00 to 1.20, as measured from viewing a SEM photomicrograph.

Advantageous Effects of Invention

In the present invention, by virtue of containing boron in an amount of 300 to 2,000 ppm and iron in an amount of 100 to 1,500 ppm, the obtained spherical magnesium oxide has a volume-based cumulative 50% particle diameter (D50) in the range of from 3 to 200 μm, as measured by a laser diffraction/scattering particle size distribution measurement, and a high sphericity of 1.00 to 1.20, as measured from viewing a SEM photomicrograph, as well as smooth surface, and has excellent moisture resistance and excellent filling properties.

The volume-based cumulative 50% particle diameter (D50) in the range of from 3 to 200 jam, as measured by a laser diffraction/scattering particle size distribution measurement, in the present invention, which is a relatively large particle diameter, is a particle diameter range such that the heat dissipation ability can be improved, and a spherical magnesium oxide having a high sphericity of 1.00 to 1.20, as measured from viewing a SEM photomicrograph, can be obtained. The volume-based cumulative 50% particle diameter (D50) of the spherical magnesium oxide, as measured by a laser diffraction/scattering particle size distribution measurement, can be preferably 15 to 150 jam, more preferably more than 25 to 130 am.

In the present invention, the reason why the spherical magnesium oxide has not only high sphericity but also smooth surface and has excellent moisture resistance and excellent filling properties is that a Li compound is not added, but boron and iron are added instead. The boron content of the spherical magnesium oxide is 300 to 2,000 ppm, preferably 400 to 1,500 ppm, more preferably 500 to 1,000 ppm. Simultaneously, the iron content of the spherical magnesium oxide is 100 to 1,500 ppm, preferably 200 to 1,300 ppm, more preferably 300 to 1,000 ppm. By the synergies obtained from the boron and iron contents, the sphericity of the spherical magnesium oxide, as measured from viewing a SEM photomicrograph, can be 1.00 to 1.20, preferably 1.00 to 1.15, more preferably 1.00 to 1.10.

In the present invention, the BET specific surface area that affects the smoothness and moisture absorption properties can be 0.01 to 1.00 m$^2$/g, preferably 0.05 to 0.80 m$^2$/g, more preferably 0.10 to 0.50 m$^2$/g.

In the present invention, because the spherical magnesium oxide has high sphericity, smooth surface, excellent moisture resistance and excellent filling properties, with respect to the pore volume as measured by a mercury intrusion pore distribution measurement, which is a parameter that affects the filling properties of the spherical magnesium oxide, the interparticle void volume is preferably 0.1 to 0.8 cm$^3$/g, more preferably 0.15 to 0.70 cm$^3$/g, further preferably 0.20 to 0.50 cm$^3$/g. Therefore, the spherical magnesium oxide of the present invention has excellent filling properties, and hence is excellent as a thermally conductive filler.

BRIEF DESCRIPTION OF DRAWINGS

FIG. 1 shows a SEM photomicrograph of the spherical magnesium oxide produced in Example 1.

DESCRIPTION OF EMBODIMENTS

The spherical magnesium oxide obtained in the present invention has a volume-based cumulative 50% particle diameter (D50), as measured by a laser diffraction/scattering particle size distribution measurement, in the range of from 3 to 200 jam, preferably 15 to 150 jam, more preferably more than 25 to 130 jam, which is the range for a relatively large particle diameter, and has not only high sphericity but also smooth surface and has excellent moisture resistance and excellent filling properties. The sphericity means a sphericity, as measured from viewing a SEM photomicrograph, and is 1.00 to 1.20, preferably 1.00 to 1.15, more preferably 1.00 to 1.10. Further, with respect to excellent smoothness and excellent moisture absorption properties, a BET specific surface area that affects the smoothness and moisture absorption properties can be 0.01 to 1.00 m$^2$/g, preferably 0.05 to 0.80 m$^2$/g, more preferably 0.10 to 0.50 m$^2$/g.

The excellent spherical magnesium oxide of the present invention can be produced by the following method which comprises:

1) reacting an aqueous solution mixed with magnesium chloride and water, with an aqueous alkali solution to obtain a magnesium hydroxide slurry, 2) then subjecting the slurry to filtration, washing with water, and drying, and then calcining the resultant material to obtain magnesium oxide particles, 3) subjecting the magnesium oxide particles in the form of a dispersion, preferably a dispersion in an organic solvent, to wet grinding, and then 4) subjecting the resultant dispersion to spray drying, and 5) calcining the thus obtained magnesium oxide to obtain an intended spherical magnesium oxide.

In this method, before the final calcination, the boron and iron contents are controlled by, for example, mixing and/or adding a boron source and an iron source so that the boron content and the iron content of the finally calcined spherical magnesium oxide become 300 to 2,000 ppm and 100 to 1,500 ppm, respectively. Specifically, the boron content and iron content of the finally obtained spherical magnesium oxide are controlled by a) adding a boron source and/or an iron source to the magnesium chloride solution, b) adding a boron source and/or an iron source to the formed magnesium hydroxide slurry, c) mixing a boron source and/or an iron source into the magnesium oxide particles, or d) adding a boron source and/or an iron source to the magnesium oxide particles which are being subjected to wet grinding.

With respect to the boron source, there is no particular limitation as long as it is a compound containing boron, but, for example, boric acid, boron oxide, boron hydroxide, boron nitride, boron carbide, ammonium borate and the like can be used. With respect to the iron source, there is no particular limitation as long as it is a compound containing iron, but, for example, iron(II) oxide, iron(III) oxide, triiron tetraoxide, iron hydroxide, iron chloride, iron nitride, iron bromide, iron fluoride and the like can be used.

The reason that the boron source is controlled so that the boron content of the finally calcined spherical magnesium oxide becomes 300 to 2,000 ppm is as follows. When the boron content is less than 300 ppm, a smooth surface is not formed, so that the moisture resistance becomes poor. Further, when the boron content is more than 2,000 ppm, a depression is formed in part of the spherical surface or magnesium oxide in a doughnut-like shape is formed, so that a spherical magnesium oxide having high sphericity cannot be obtained. On the other hand, the reason that the iron source is controlled so that the iron content of the finally calcined spherical magnesium oxide becomes 100 to 1,500 ppm is as follows. When the iron content is less than 100 ppm, the moisture resistance becomes poor, or a depression is formed in part of the spherical surface, so that a spherical magnesium oxide having high sphericity cannot be obtained. Further, when the iron content is more than 1,500 ppm, a number of fine particles are formed on the surface of the spherical magnesium oxide, so that the moisture resistance becomes poor.

The aqueous magnesium chloride solution to be used can be selected from magnesium chloride hexahydrate, magnesium chloride dihydrate, anhydrous magnesium chloride, bittern, sea water and the like, and a combination thereof.

The aqueous alkali solution to be used can be selected from an aqueous sodium hydroxide solution, an aqueous calcium hydroxide solution, aqueous ammonia and the like, and a combination thereof.

The obtained magnesium oxide particles are made to be in the form of a dispersion and subjected to wet grinding and spray drying. With respect to the solvent used here, there is no particular limitation, but, for example, a known organic solvent commonly used, such as methanol, ethanol, propanol, butanol, pentanol, ethylene glycol monomethyl ether, ethylene glycol monoethyl ether, propylene glycol monoethyl ether, diethylene glycol monomethyl ether, dipropylene glycol monoethyl ether, ethylene glycol, propylene glycol, diethylene glycol, triethylene glycol, glycerol, trimethylolpropane, pentaerythritol, acetone, formic acid, acetic acid, propionic acid, tetrahydrofuran, toluene and the like can be used.

With respect to the method for spray drying, there is no particular limitation, but, for example, a spray drying method is preferably used, in which the obtained magnesium oxide dispersion after the wet grinding is sprayed from a rotating disc or a nozzle to obtain magnesium oxide particles. The concentration of the dispersion being subjected to wet grinding and spraying is preferably controlled so that the magnesium oxide concentration becomes 50 to 70 wt %.

With respect to the conditions for calcination, there is no particular limitation as long as the magnesium oxide particles are sintered, but the temperature for calcination is preferably 1,000 to 1,800° C., more preferably 1,100 to 1,700° C., especially preferably 1,200 to 1,600° C. The calcination time varies depending on the calcination temperature, but is preferably 0.5 to 10 hours. When the calcination temperature is lower than 1,000° C., the magnesium oxide particles are not satisfactorily sintered, and, when the calcination temperature is higher than 1,800° C., the particles are sintered together to form a coarse aggregate. Therefore, the calcination temperature is controlled to be in the above-mentioned range.

The spherical magnesium oxide of the present invention has a feature that it has a satisfactory moisture resistance without subjected to surface treatment, but the spherical magnesium oxide can be subjected to surface treatment using a known method for the purpose of further improving the moisture resistance. When the spherical magnesium oxide of the present invention is subjected to surface treatment, with respect to the surface treatment agent to be used, there is no particular limitation, but, for example, colloidal silica, a silane coupling agent, a titania sol, a titanate coupling agent, a phosphorus compound, an alumina sol, an aluminate coupling agent, a zirconium coupling agent and the like can be used.

Examples of silane coupling agents include vinyltrichlorosilane, vinyltrialkoxysilane, glycidoxypropyltrialkoxysilane and methacryloxypropylmethyldialkoxysilane.

Examples of titanate coupling agents include tetraisopropyl titanate, tetranormalbutyl titanate, tetraoctyl titanate, tetrastearyl titanate, isopropyltriisostearoyl titanate, tetraoctyl bis(ditridecyl phosphite)titanate and bis(dioctyl pyrophosphate)oxyacetate titanate.

With respect to the phosphorus compound, there is no particular limitation as long as it is a compound which is capable of reacting with magnesium oxide to form a magnesium phosphate compound, but examples include phosphoric acid, phosphoric acid salts and alkyl acid phosphates. These may be used individually or in combination. Examples of acid phosphates include isopropyl acid phosphate, 2-ethylhexyl acid phosphate, oleyl acid phosphate, methyl acid phosphate, ethyl acid phosphate, propyl acid phosphate, butyl acid phosphate, lauryl acid phosphate and stearyl acid phosphate.

Examples of aluminate coupling agents include aluminum isopropylate, mono-sec-butoxyaluminum diisopropylate, aluminum sec-butyrate, aluminum ethylacetoacetate diisopropylate, aluminum tris(ethylacetoacetate) and aluminum alkylacetoacetate diisopropylate.

Examples of zirconium coupling agents include normalpropyl zirconate and normalbutyl zirconate.

The spherical magnesium oxide of the present invention has an advantage in that it has high sphericity and exhibits excellent filling properties when filling a resin, and has smooth surface and high moisture resistance. Therefore, the spherical magnesium oxide can be advantageously incorporated as a filler into a resin, and is excellent as a thermally conductive filler. As a resin usable in the present invention, for example, there can be mentioned a thermosetting resin and a thermoplastic resin. With respect to the thermosetting resin, there is no particular limitation, but examples include a phenolic resin, an urea resin, a melamine resin, an alkyd resin, a polyester resin, an epoxy resin, a diallyl phthalate resin, a polyurethane resin and a silicone resin. With respect to the thermoplastic resin, there is no particular limitation, but examples include a polyamide resin, a polyacetal resin, a polycarbonate resin, a polybutylene terephthalate resin, a polysulfone resin, a polyamide-imide resin, a polyether imide resin, a polyarylate resin, a polyphenylene sulfide resin, a polyether ether ketone resin, a fluororesin and a liquid crystalline polymer.

The amount of the spherical magnesium oxide incorporated into the resin composition of the present invention may be appropriately determined according to the properties required for the resin composition, and is not particularly limited. However, as an example, the spherical magnesium oxide may be used in an amount in the range of from 0.1 to 100 parts by mass, relative to 100 parts by mass of the resin.

The resin composition containing the spherical magnesium oxide of the present invention can be utilized in various fields according to the properties of the resin. However, the spherical magnesium oxide of the present invention has excellent thermal conductivity, and therefore the resin composition of the present invention can be especially advantageously used for the application in which the resin composition is required to have heat dissipation properties. Further, the resin composition of the present invention can be utilized as a semiconductor encapsulation material having excellent thermal conductivity and excellent moisture resistance.

[Evaluation Method]
(1) Method for Measuring Boron and Iron Contents

The measurement of boron and iron contents was conducted by ICP emission spectrometry.

A measurement sample was added to 12 N hydrochloric acid (special grade reagent) and completely dissolved by heating, and then boron and iron contents were measured using an ICP measurement apparatus (PS3520 VDD, manufactured by Hitachi High-Tech Science Corporation).

(2) Method for Measuring a BET Specific Surface Area

Using a specific surface area measurement apparatus (Macsorb, manufactured by Mountech Co., Ltd.), a BET specific surface area was measured by a gas adsorption method (BET method) using nitrogen gas.

(3) Volume-Based Cumulative 50% Particle Diameter (D50)

$0.1 \times 10^{-3}$ kg of a measurement sample was accurately weighed and dissolved in 40 mL of methanol, and subjected to measurement using a laser diffraction/scattering particle size distribution measurement apparatus (MT3300, manufactured by Nikkiso Co., Ltd.).

(4) Sphericity and Smoothness of the Surface, as Measured from Viewing a SEM Photomicrograph.

A scanning electron microscope (SEM) (JSM6510LA, manufactured by JEOL LTD.) was used. With respect to 100 particles seen in the taken electron photomicrograph, lengths of a long diameter and a short diameter which pass through the center of each particle were measured, and a long diameter/short diameter ratio was determined, and an average of the ratio values was taken as a sphericity. Further, with respect to the spherical magnesium oxide viewed in the electron photomicrograph taken by the scanning electron microscope (SEM), the surface state was evaluated according the following criteria:

a spherical magnesium oxide in which almost no fine particle is present on the surface and the surface is smooth is rated as "○";

a spherical magnesium oxide in which a plurality of fine particles are present on the surface but the surface is smooth or in which almost no fine particle is present on the surface but the surface is uneven and not smooth is rated as "Δ"; and a spherical magnesium oxide in which a plurality of fine particles are present on the surface and the surface is uneven and not smooth is rated as "x"

(5) Mercury Intrusion Pore Distribution

An interparticle void volume obtained by mercury intrusion pore distribution measurement is a parameter that affects the filling properties of a spherical magnesium oxide, and was determined under the conditions described below. As a mercury intrusion pore distribution measurement apparatus, AutoPore IV 9510, manufactured by Micromeritics Instrument Company, was used to measure a pore distribution. As mercury, a mercury reagent of special grade having a purity of 99.5 mass % or more and a density of $15.5335 \times 10^3$ kg/m$^3$ was used. As a measurement cell, a cell for powdery sample having a cell internal volume of $5 \times 10^{-6}$ m$^3$ and a stem volume of $0.38 \times 10^{-6}$ m$^3$ was used. A measurement sample was accurately weighed in mass in the range of from $0.10 \times 10^{-3}$ to $0.13 \times 10^3$ kg, and the measurement cell was filled with the sample. The measurement cell was set in the apparatus, and then the inside of the cell was maintained in a reduced pressure state at a pressure of 50 µHg (6.67 Pa) or less. Then, the measurement cell was filled with mercury until the pressure reached 1.5 psia (10,342 Pa). Then, the mercury was intruded under a pressure in the range of from 2 psia (13,790 Pa) to 60,000 psia (413.7 MPa) to measure a pore distribution.

The intrusion pressure for mercury was converted to a pore diameter using the following formula (I).

$$D = -(1/P) \cdot 4\gamma \cdot \cos \Psi \quad (I)$$

In the above formula:
D: a pore diameter (m);
P: the intrusion pressure (Pa) for mercury;
γ: the surface tension (485 dyne·cm$^{-1}$ (0.485 Pa·m)) of mercury; and
Ψ: the angle of contact (130°=2.26893 rad) of mercury.

(6) Evaluation of Moisture Resistance by a Temperature and Humidity Controlled Test The moisture resistance of a spherical magnesium oxide was evaluated using a weight increase ratio determined by a temperature and humidity controlled test.

As a temperature and humidity controlled testing chamber, THN040FA, manufactured by Advantech Toyo Kabushiki Kaisha, was used. 10 g of a spherical magnesium oxide was allowed to stand in an environment at 85° C. and at 85% RH for 168 hours using the temperature and humidity controlled testing chamber, and then a weight increase ratio was determined from the resultant spherical magnesium oxide.

EXAMPLES

Examples and Comparative Examples

Example 1

Anhydrous magnesium chloride (MgCl$_2$) was dissolved in ion-exchanged water to prepare an about 3.5 mol/l aqueous solution of magnesium chloride. The MgCl$_2$ solution and a 25% NaOH solution were individually fed to a reactor using metering pumps so that the reaction rate of MgCl$_2$ became 90 mol %, performing a continuous reaction.

Then, boric acid (manufactured by Kanto Chemical Co., Inc.; special grade reagent) and iron(II) oxide (manufactured by Hayashi Pure Chemical Ind., Ltd.) were added to the reaction mixture so that the boron content and the iron content of the finally obtained spherical magnesium oxide became 650 ppm and 350 ppm, respectively. Then, the resultant mixture was subjected to filtration, and washed with water and dried to obtain magnesium hydroxide. The obtained magnesium hydroxide was calcined at 900° C. for one hour to obtain magnesium oxide particles. An organic solvent was added to the obtained magnesium oxide particles so that the concentration became 60 wt %. Then, the resultant dispersion was subjected to wet grinding using a ball mill for 4 hours, and then subjected to spray drying by a spray drying method. The obtained magnesium oxide after the spray drying was calcined using an electric furnace at 1,600° C. for one hour to obtain an intended spherical magnesium oxide. The physical properties of the obtained spherical magnesium oxide were evaluated by the above-mentioned test methods. The results are shown in the table below.

Example 2

A spherical magnesium oxide was obtained using substantially the same method as in Example 1 except that boric acid and iron(II) oxide were added to the reaction mixture so that the boron content and the iron content of the spherical magnesium oxide became 900 ppm and 350 ppm, respectively. The physical properties of the obtained spherical magnesium oxide were evaluated in the same manner as in Example 1.

Example 3

A spherical magnesium oxide was obtained using substantially the same method as in Example 1 except that boric acid and iron(II) oxide were added to the reaction mixture so that the boron content and the iron content of the spherical magnesium oxide became 1,000 ppm and 350 ppm, respectively. The physical properties of the obtained spherical magnesium oxide were evaluated in the same manner as in Example 1.

Example 4

A spherical magnesium oxide was obtained using substantially the same method as in Example 1 except that boric acid and iron(II) oxide were added to the reaction mixture so that the boron content and the iron content of the spherical magnesium oxide became 1,500 ppm and 350 ppm, respectively. The physical properties of the obtained spherical magnesium oxide were evaluated in the same manner as in Example 1.

Example 5

A spherical magnesium oxide was obtained using substantially the same method as in Example 1 except that boric acid and iron(II) oxide were added to the reaction mixture so that the boron content and the iron content of the spherical magnesium oxide became 650 ppm and 800 ppm, respectively. The physical properties of the obtained spherical magnesium oxide were evaluated in the same manner as in Example 1.

Example 6

A spherical magnesium oxide was obtained using substantially the same method as in Example 1 except that boric acid and iron(II) oxide were added to the reaction mixture so that the boron content and the iron content of the spherical magnesium oxide became 650 ppm and 1,300 ppm, respectively. The physical properties of the obtained spherical magnesium oxide were evaluated in the same manner as in Example 1.

Example 7

A spherical magnesium oxide was obtained using substantially the same method as in Example 1 except that boric acid and iron(II) oxide were added to the reaction mixture so that the boron content and the iron content of the spherical magnesium oxide became 300 ppm and 400 ppm, respectively. The physical properties of the obtained spherical magnesium oxide were evaluated in the same manner as in Example 1.

Comparative Example 1

A spherical magnesium oxide was obtained using substantially the same method as in Example 1 except that the boron source and iron source were not added. The physical properties of the obtained spherical magnesium oxide were evaluated in the same manner as in Example 1.

Comparative Example 2

A spherical magnesium oxide was obtained using substantially the same method as in Example 1 except that boric acid and iron(II) oxide were added to the reaction mixture so that the boron content and the iron content of the spherical magnesium oxide became 2,100 ppm and 350 ppm, respectively. The physical properties of the obtained spherical magnesium oxide were evaluated in the same manner as in Example 1.

Comparative Example 3

A spherical magnesium oxide was obtained using substantially the same method as in Example 1 except that boric acid and iron(II) oxide were added to the reaction mixture so that the boron content and the iron content of the spherical magnesium oxide became 650 ppm and 1,700 ppm, respectively. The physical properties of the obtained spherical magnesium oxide were evaluated in the same manner as in Example 1.

Comparative Example 4

A spherical magnesium oxide was obtained using substantially the same method as in Example 1 except that boric acid and iron(II) oxide were added to the reaction mixture so that the boron content and the iron content of the spherical magnesium oxide became 500 ppm and 70 ppm, respectively. The physical properties of the obtained spherical magnesium oxide were evaluated in the same manner as in Example 1.

With respect to Examples 1 to 7 and Comparative Examples 1 to 4, the measurement of a boron content, an iron content, and a 50% particle diameter D50, the measurement of a BET specific surface area, the pore distribution measurement by a mercury intrusion method (interparticle void volume), the measurement of a sphericity from a SEM image, and the evaluation of the surface state were conducted, and the results for Examples 1 to 7 are shown in Table 1 and the results for Comparative Examples 1 to 4 are shown in Table 2. From Tables 1 and 2, it is apparent that the spherical magnesium oxide having the boron content and iron content controlled to be in the respective predetermined ranges has a small interparticle void volume and hence has excellent filling properties, and further has excellent surface state and excellent moisture resistance.

TABLE 1

|  | Example 1 | Example 2 | Example 3 | Example 4 | Example 5 | Example 6 | Example 7 |
|---|---|---|---|---|---|---|---|
| Sphericity | 1.05 | 1.12 | 1.09 | 1.16 | 1.15 | 1.12 | 1.13 |
| Surface state | ○ | ○ | ○ | ○ | ○ | ○ | ○ |
| Boron content (ppm) | 660 | 880 | 1030 | 1460 | 632 | 604 | 308 |
| Iron content (ppm) | 361 | 356 | 350 | 344 | 779 | 1253 | 406 |
| D50 (μm) | 60.08 | 58.66 | 66.09 | 58.15 | 55.16 | 58.67 | 117.0 |
| BET Specific surface area ($m^2/g$) | 0.09 | 0.09 | 0.09 | 0.12 | 0.11 | 0.11 | 0.07 |
| Interparticle void volume ($cm^3/g$) | 0.25 | 0.27 | 0.28 | 0.27 | 0.28 | 0.29 | 0.57 |
| Moisture resistance (Wight increase %) | 0.10 | 0.17 | 0.14 | 0.39 | 0.38 | 0.45 | 0.27 |

TABLE 2

|  | Comparative Example 1 | Comparative Example 2 | Comparative Example 3 | Comparative Example 4 |
|---|---|---|---|---|
| Sphericity | 1.1 | 1.31 | 1.08 | 1.39 |
| Surface state | x | Δ | x | Δ |
| Boron content (ppm) | <1 | 2030 | 580 | 520 |
| Iron content (ppm) | <1 | 330 | 1679 | 76 |
| D50 (μm) | 49.79 | 60.58 | 56.77 | 60.76 |
| BET Specific surface area ($m^2/g$) | 3.06 | 0.15 | 0.12 | 0.16 |
| Interparticle void volume ($cm^3/g$) | 0.36 | 0.29 | 0.29 | 0.36 |
| Moisture resistance (Wight increase %) | 10.67 | 0.57 | 0.63 | 0.63 |

INDUSTRIAL APPLICABILITY

As apparent from the evaluation in the Examples and Comparative Examples, the spherical magnesium oxide obtained in the present invention has high sphericity and smooth surface, and has excellent moisture resistance and excellent filling properties. Therefore, the spherical magnesium oxide of the present invention is advantageously used as excellent thermally conductive filler.

The invention claimed is:

1. A spherical magnesium oxide containing boron in an amount of 300 to 2,000 ppm and iron in an amount of 100 to 1,500 ppm, having a volume-based cumulative 50% particle diameter (D50) in the range of from 3 to 200 μm, as measured by a laser diffraction/scattering particle size distribution measurement, and having a sphericity of 1.00 to 1.20, as measured from viewing a SEM photomicrograph.

2. The spherical magnesium oxide according to claim 1, wherein the cumulative 50% particle diameter (D50) is in the range of from 25 to 150 μm.

3. The spherical magnesium oxide according to claim 1, which has a BET specific surface area of 0.01 to 1.00 $m^2/g$.

4. The spherical magnesium oxide according to claim 1, which has an interparticle void volume of 0.1 to 0.8 $cm^3/g$ in a mercury intrusion pore distribution.

5. A thermally conductive filler containing the spherical magnesium oxide according to claim 1.

6. A resin composition containing the thermally conductive filler according to claim 5.

7. A method for producing the spherical magnesium oxide according to claim 1, the method comprising the steps of:
  1) reacting an aqueous solution of magnesium chloride with an aqueous alkali solution to prepare a magnesium hydroxide slurry;
  2) drying the magnesium hydroxide slurry and then calcining the dried slurry to prepare magnesium oxide particles;
  3) subjecting the magnesium oxide particles in the form of a dispersion to wet grinding;
  4) subjecting the resultant dispersion of the magnesium oxide to spray drying; and
  5) calcining the resultant magnesium oxide, wherein, in any of the steps 1) to 4), the boron and iron contents are controlled so that the boron content and the iron content of the calcined magnesium oxide become 300 to 2,000 ppm and 100 to 1,500 ppm, respectively.

8. The spherical magnesium oxide according to claim 2, which has a BET specific surface area of 0.01 to 1.00 $m^2/g$.

9. The spherical magnesium oxide according to claim 2, which has an interparticle void volume of 0.1 to 0.8 $cm^3/g$ in a mercury intrusion pore distribution.

10. The spherical magnesium oxide according to claim 8, which has an interparticle void volume of 0.1 to 0.8 $cm^3/g$ in a mercury intrusion pore distribution.

11. A thermally conductive filler containing the spherical magnesium oxide according to claim 2.

12. A thermally conductive filler containing the spherical magnesium oxide according to claim 3.

13. A thermally conductive filler containing the spherical magnesium oxide according to claim 4.

14. A thermally conductive filler containing the spherical magnesium oxide according to claim 8.

15. A thermally conductive filler containing the spherical magnesium oxide according to claim 9.

16. A resin composition containing the thermally conductive filler according to claim 11.

17. A resin composition containing the thermally conductive filler according to claim 12.

18. A resin composition containing the thermally conductive filler according to claim 13.

19. A resin composition containing the thermally conductive filler according to claim 14.

20. A resin composition containing the thermally conductive filler according to claim 15.

* * * * *